United States Patent [19]
Abbott et al.

[11] Patent Number: 6,135,881
[45] Date of Patent: Oct. 24, 2000

[54] SPORTS FORECASTING GAME

[75] Inventors: James P. Abbott, Omaha, Nebr.; Kenneth Mixter, Hanover, Pa.

[73] Assignee: Inventure, Inc., Baltimore, Md.

[21] Appl. No.: 09/050,374

[22] Filed: Mar. 31, 1998

Related U.S. Application Data

[60] Provisional application No. 60/042,265, Mar. 31, 1997.

[51] Int. Cl.[7] ........................................ A63F 9/22
[52] U.S. Cl. ................... 463/3; 463/40; 463/9; 463/1; 273/108.3
[58] Field of Search ................... 463/3, 2, 4, 36, 463/37, 38, 43, 44, 40, 41, 42; 273/1 E, 85 G, 317.6, 236, 138.2, 132, 108.1, 108.3, 277, 461

[56] References Cited

U.S. PATENT DOCUMENTS

| | | | |
|---|---|---|---|
| 4,215,861 | 8/1980 | Nemeth | 273/85 G |
| 4,324,402 | 4/1982 | Klose | 273/88 |
| 4,496,148 | 1/1985 | Morstain et al. | 273/1 E |
| 4,540,174 | 9/1985 | Coppock | 273/138 R |
| 4,572,509 | 2/1986 | Sitrick | 273/85 G |
| 4,592,546 | 6/1986 | Fascenda et al. | 273/1 E |
| 4,662,635 | 5/1987 | Enokian | 273/94 |
| 4,722,526 | 2/1988 | Tovar et al. | 273/1 E |
| 4,998,199 | 3/1991 | Tashiro et al. | 364/410 |
| 5,083,271 | 1/1992 | Thacher et al. | 364/411 |
| 5,263,723 | 11/1993 | Pearson et al. | 273/439 |
| 5,538,255 | 7/1996 | Barker | 463/41 |
| 5,586,257 | 12/1996 | Perlman | 463/42 |
| 5,618,045 | 4/1997 | Kagan et al. | 463/40 |
| 5,639,084 | 6/1997 | Kawasaki | 473/421 |
| 5,735,743 | 4/1998 | Murata et al. | 463/35 |
| 5,769,714 | 6/1998 | Weiner et al. | 463/3 |
| 5,816,953 | 10/1998 | Cleveland | 473/459 |
| 5,860,862 | 1/1999 | Junkin | 463/40 |
| 5,890,906 | 4/1999 | Macri et al. | 434/247 |
| 5,911,582 | 6/1999 | Redford et al. | 434/307 |
| 5,988,861 | 11/1999 | Baum | 364/565 |

*Primary Examiner*—Jessica J. Harrison
*Assistant Examiner*—Minh Trinh
*Attorney, Agent, or Firm*—Hogan & Hartson, LLP; Celine Jimenez Crowson

[57] ABSTRACT

A method of remotely interfacing with at least one player in a rule-based game over a communication medium operatively connected to one or more communication devices including a visual display wherein each player is associated with a communication device, includes visually displaying at one or more of the communication devices a form comprising a two-dimensional matrix having a cell at the juncture of each row and column and where each cell may be manipulated to reflect a game choice by the player, retrieving by a server each game choice made by the player before any subsequent game choice is made by the player, applying the rules of the game to determine what further game choices are available to the player based upon the game choices retrieved, generating a revised form reflecting game choices made by the player and game choices which are available for the player to make, transmitting the revised form to the communication device being used by the player, and visually displaying the revised form at the communication device being used by the player.

20 Claims, 6 Drawing Sheets

FIG. 1A

| | | RUNS | HITS | RBI | HR | 2+ HITS |
|---|---|---|---|---|---|---|
| 1 | ANDERSON | 🏏 | | ? | ? | ? |
| 2 | ALOMAR | | 🏏 | ? | ? | ? |
| 3 | PALMEIRO | ? | | ? | ? | ? |
| 4 | DAVIS | ? | | ? | ? | ? |
| 5 | SURHOFF | | ✗ | 🏏 | | |
| 6 | RIPKEN | | | | | |
| 7 | HOILES | | 🏏 | | | 🏏 |
| 8 | BORDICK | | | | | |
| 9 | CARTER | | | | | |

CARTER
BAINES
HAMMONDS
ALL OTHERS ← MAY SELECT ONLY ONE FOR ROW 9

FIG. 1B

PITCHING GRID

|  | IP 6+ | K | IP-R | IP-H | Win |
|---|---|---|---|---|---|
| Starter | ? | ? | ? | ? | ? |
|  | IP 3+ | K | IP-R | IP-H | W/Sv |
| Relievers | ? | ? | ? | ? | ? |

70 — Current game selections/Latest results viewing
72 — Game in Progress/Selections end for game
74 — Next game selections begin/Current/Last results Viewing Continues
76 — Game Closing/Importing/Statistical ranking

FIG. 4A

HITTING GRID

| TOP FIVE PLACES IN THE ROSTER | | |
|---|---|---|
| Categories | IF SAFE: (click once on unselected square) | IF RISK: (click once on selected square) |
| RUNS | 2 points for each run scored | 4 points each<br>-2 if no RUNS |
| HITS | 1 point for each hit | 2 points each<br>-2 if no HITS |
| RBIs | 2 points for each run batted in | 4 points each<br>-2 if no RBI |
| HRs | 4 points for each home run | 8 points each<br>-1 if no home run |
| 2+ HITS | 4 points if the batter gets 2 or more hits | 8 points if 2 or more hits<br>-1 if less than 2 hits |
| BOTTOM FOUR PLACES IN THE ROSTER (points are higher-risk is higher) | | |
| RUNS | 4 points for each run scored | 8 points each<br>-4 if no runs scored<br>(-2 in pull-down) |
| HITS | 2 points for each hit | 4 points each<br>-4 if no hits<br>(-2 in pull-down) |
| RBIs | 4 points for each run batted in | 8 points each<br>-4 if no RBI<br>(-2 in pull-down) |
| HRs | 8 points for each home run | 16 points each<br>-2 if no home run<br>(-1 in pull-down) |
| 2+ HITS | 8 points if the batter gets 2 or more hits | 16 points if 2 or more hits<br>-2 if less than 2 hits (-1 in pull-down) |

REMEMBER: YOU LOSE POINTS FOR EACH FAILED RISK.

FIG. 4B

PITCHING GRID

| STARTING PITCHER | |
|---|---|
| Categories | IF SAFE: (click once on unselected square) |
| IP | 6 points if 6 full innings pitched (partial innings do not count) |
| K | 1 point for each strikeout |
| IP-RUNS | 2 points (IP minus RUNS allowed) = points earned |
| IP-HITS | 3 times (IP minus HITS allowed) = points earned |
| WIN | 10 points if the starter wins |
| ALL RELIEF PITCHERS | |
| IP | 6 points if 3 full innings pitched |
| K | 2 points for each strikeout |
| IP-RUNS | 4 times (IP minus RUNS allowed) = points earned |
| IP-HITS | 6 times (IP minus RUNS allowed) = points earned |
| WIN/SAVE | 10 points if a relief pitcher gets a win or a save (no double score for win and save) |

REMEMBER: RISK IS NOT AVAILABLE ON THE PITCHING GRID

SPORTS FORECASTING GAME

Applicant claims the benefit of co-pending U.S. Provisional application serial no. 60/042,265 filed Mar. 31, 1997.

The present invention relates to sports forecasting games, especially multi-player baseball forecasting games.

Prior to the present invention, baseball forecasting or "fantasy"-type games (for example, Rotisserie™-style games) always have required game players to make their strategic plays by selecting a "team" of baseball players from among a large set of possible baseball player choices (generally all of the players in both Major Leagues or all the players in one of the two Major Leagues). A game player's team, however, bore no relation to the actual make-up of any particular Major League team. In these prior games, game players earn points based upon the real-life performances of each team member. Once each game player had formed his or her fantasy "team," thus forming a fantasy "league" of players, each game player earned the same number of points as other game players who selected the same baseball player. Thus, for example, a real-life winning pitching performance by Player X would earn the same number of points for every game player whose fantasy team included Player X.

Other prior art fantasy/forecast games have included a variety of statistical categories to determine the point value of a real-life player's performance, but such games have always counted and weighed the selected categories the same for every game player who had selected a particular baseball player. In all known prior baseball fantasy/forecast games, therefore, the ultimate and key game objective was to select the optimal fantasy "team" of, for example, 20 to 30 players, out of the very large pool (for example 300 to 600) of available baseball player selections as set by the real-life rosters of all Major League baseball teams. The variation within game play was created by the fact that game players inevitably select different fantasy teams whose rosters generate different statistics and therefore different total point values over a season.

The present invention provides a new and substantially more interesting and challenging fantasy sports game. Instead of the past practice of treating the on-field results of each baseball player the same for each game player (and thus generating the variation necessary to make the game competitive by having each game player select his or her own differently configured fantasy team), the present invention permits game players to make a wide variety of different strategic forecasts with respect to each of a small number of real-life players. Further, unlike the prior art games discussed above, all of the real-life players available to the game players are on the same real-life team.

One difference between an embodiment of the present invention and previous fantasy/forecast games is that in the present invention all game players must play with the same very limited number of real-life athletes (11–15), all of whom play for the same team. Game players cannot choose broadly among all Major League baseball athletes, but must restrict their choices to the athletes of a single Major League team.

This is an imposing game constraint, because if the same rules as in all prior fantasy/forecast games were applied in the game environment of the present invention, there would not be enough variation to create competition among large numbers of game players, because many game players would choose the same athletes for their fantasy team and thus would attain the same game score. On the other hand, it is this very constraint that makes the present invention attractive to so many players. Because of this constraint, players do not need a working knowledge of athletes beyond those who play for their favorite team. This makes the present game attractive to a much wider group of potential game players.

A second distinction from all prior fantasy/forecast games, is that a single real-life player can be utilized in an embodiment of the present invention in many different ways. Game players are offered the opportunity to select among 51 different strategic plays for each of the limited number of available real-life athletes. This means that, in an embodiment of the present invention, the limited number of available athletes actually can be selected in many different strategic combinations.

A variety of "strategic selections" are available for each athlete and are generated by the game player selecting a limited number of athletes for zero, one or two categories out of five common statistical categories (for example: runs, hits, RBI, home runs, multiple-hit games or other statistical category).

A third distinction of an embodiment of the present invention over prior art games is the ability for a game player to designate certain categories as "risk" categories, in which the score for a particular athlete in that category is doubled (at the risk of losing points if the athletes fail to generate an entry above zero for that category). Through this mechanism, the amount of variation available in each game player's use of a particular real-life athlete is dramatically increased, to the 51 different plays per athlete.

A fourth distinction of an embodiment of the present invention over prior art games is that any of the game players' selections can be instantaneously changed at any time (with the exception of the time during which the actual Major League games on which the game is based are being played) during the baseball season, allowing each player to continually and completely revise and update his or her selections. In all prior fantasy/forecast baseball games, changes were rigorously constrained by rules limiting changes to the roster of the players' fantasy teams.

A fifth distinction of an embodiment of the present invention over prior art games is that the game integrates timely information into its interface, available publicly nowhere else at the time it is provided. This information is the new lineup posted each day by the real manager of the Major League team on which the game is based. The availability well in advance of each game of this information allows the strategic choices mentioned above to be well-informed on each new day, because the structure of the lineup directly affects the strategic moves made by players in an embodiment of the present invention.

A sixth distinction over the prior art is that the game is organized into a network of 30 smaller "Team" games, one for each Major League team. Each Team game includes separate competitions at the daily, bi-weekly, seasonal, league and cumulative levels. However, a champion from each Team competition competes against 29 others in a "National" competition for the title of national champion, awarded annually. In all prior fantasy/forecast baseball games, the competition was conducted in a single competition, not divided into separate Team games.

A seventh distinction over the prior art is that the game permits players to begin play at any time during the baseball season and still have a chance to win in the competition, including a chance to win the overall championship. In prior art games, players had to be present at the time of a "draft" or other selection mechanism, at the start of the baseball season in order to have a chance to win.

An eighth distinction over prior art games is that the top players from all previous competitions during each baseball season are invited to compete against one another during a "Stretch Drive" competition from which other players are excluded. This competition takes place during the last month of the season. All qualifying players scores start at zero for this competition. In prior art games, no such competition exists, and players simply play out the end of the season in the same configuration that they played all season, with dramatically less chance of winning if they were not already in the lead when the last month began.

A ninth distinction over the prior art is that the players may choose to compete on a local level, against friends and associates, in small groups of 2 or more. In prior art games, players are randomly assigned to leagues of 25 or larger.

A tenth distinction over the prior art is that dynamic data generates new results after each game, which then promptly are reported over the Internet to players after each game. In prior art games, reports of results were made on a weekly (or less frequent) basis.

An eleventh distinction over the prior art is that the invention will update players' scores on a real-time basis as events transpire in actual sports events. These real time reports will be reported on the Internet or other electronic data distribution systems yet to be devised during the course of actual games.

Yet another distinction of an embodiment of the present invention over prior art games is that all play preferably and advantageously takes place on personal computers connected to a common server on the World Wide Web network, using bright, colorful graphical interfaces that invite participation and immerse the player in the baseball experience. The present invention draws the family into the game.

For games to become popular and commercially successful, they need to be played repeatedly. Game play on the World Wide Web permits the game and its players easily to focus on the statistics that are generated each day by the play of Major League Baseball teams, and that are reported in the media in the form of "box scores." By identifying the new lineups and the box scores as dynamic data input events that would recur each day throughout the six-month Major League Baseball season, applicant was able to utilize real time, real world variables in order to determine the outcome of the players' games each day. At the same time, the principal motivation for people to return to the game each day would be created dynamically out in the real world (namely, the results of real-life sporting events), and would not have to be generated out of the game itself. Because the present invention is more deeply centered in the play of real teams, the game is more properly called a "forecasting" than a "fantasy" game.

It should be clear that the present invention is not restricted solely to the sport of baseball. The same principles that make the present invention in the baseball market appealing are equally applicable in other sports markets such as, by way of example, football, basketball, hockey, soccer, golf, tennis, horse racing, auto racing, etc. Nor is the concept limited only to sports. Dynamic data events are being generated in virtually every area of human endeavor, and are now being reported in the media and particularly on the World Wide Web—with consistency and ease of access. Forecasting games that relate to the performance of stock, commodity, options and other financial markets—as well as of demographic, travel and weather patterns, of media ratings, and of book and other sales, are examples, of other contexts to which the present invention can be applied.

The present invention takes advantage of the World Wide Web's great strengths in database management and prompt information delivery. Play on the present invention is almost completely asynchronous, permitting thousands of players to play each day without suffering any disadvantage because others played before them, and without causing delay in play while waiting for others to make their game selections. Thus, the present invention allows competitive, multi-player play without ever gathering everyone together at one time or in one place. At the same time, because its design does not rely on instantaneous reaction time, it avoids any significant negative impact from the latency period between a player's selection on his (client) computer and the response from the server.

The present invention also benefits from the ability of the Web server to control a relatively complex set of variables, and make the game appear quite simple to players. This is accomplished through the use of an interactive playing form that guides play in accordance with the rules of the present invention.

Preferably, a Java applet is downloaded and runs two small client-based playing forms on which a limited number of playing cells create a very large number of options and opportunities for play. If a player's Web browser does not support Java script, then a server-based CGI program is used. Each cell in the form is assigned a particular value in the game, and the player interface program of the preferred embodiment does the following (illustrated here in the context of a baseball game, but in no way is the present invention limited to the context of baseball):

1) it keeps track of the value of each cell—a value which may vary according to the type of baseball event that is being tracked (such as hits or runs scored). For example,
    In the top of the order (top five slots):
       Each run scored is worth 2 points.
       Each hit is worth 1 point.
       Each RBI is worth 2 points.
       Each home run is worth 4 points.
       Each multiple hit game is worth 4 points. (There is no benefit to the player if the batter gets more than two hits.)
    In the bottom of the order (last four slots):
       All scores by batters from the bottom of the order are doubled.
       Each run scored is worth 4 points.
       Each hit is worth 2 points.
       Each RBI is worth 4 points.
       Each home run is worth 8 points.
       Each multiple hit game is worth 8 points. (There is no benefit to you if the batter gets more than two hits.)
2) it reports to players the scoring rules by way of a help function accessible through the form;
3) it changes the "values" of the cells when a game player decides to place particular emphasis on a specific cell (through the selection of the cell as a "risk" cell as hereinbefore described), so that individual cells range in values from 1 to 24 points (either as a fixed score, or in many cases, multiplied by the number of times that an event recurs);
4) it enforces a relatively complex set of the present invention playing rules by automatically closing off those portions of the form that can no longer be played, once certain moves have been made. For example, the playing form automatically closes off a five column row as soon as two columns have been selected, and closes off a nine row column as soon as three rows have been selected. This guides the game player to compliance with the rules, while leaving the game fun to play;

5) it records and sends to the database, on a completely flexible timetable that permits asynchronous play by competing players, the selections made by thousands of remote players who access the program through the World Wide Web;

6) it permits the development of "friends leagues" in which game players easily can organize and track competition at personal, family, or community levels;

7) it allows players to respond each day to subtle changes to the lineup or roster of the real-life Major League team; and 8) it provides direct links to additional information that educates and informs players about strategic moves within the game. For example, players can obtain very specific statistical information about the performance of hitters against the pitchers that they will face each day.

The present invention employs a database that is based upon a daily dynamic input event. The database performs the following functions:

1) it holds asynchronously posted selections in its database, and permits players to make any changes desired, until game time each day during the season;

2) it holds the entire Major League schedule and it closes off entries automatically at game time in a process called "opening;"

3) it records in its database the outcome of the real life Major League games on which the present invention is based as soon as that information is provided to it, preferably automatically incorporating the data sent to it from a third party without human intervention;

4) it compares the real life results with the plays of all competing players in a process called "closing;"

5) it calculates and records all game results according to a set of rules which may vary and automatically displays those results in response to requests by players' computers, to the central tally of overall, contest, league and daily results, and to selected subsets (such as Friends Leagues) of the overall database. All this occurs shortly after the end of each Major League game each day during the season;

6) it publishes on the Web in standard format all results set forth above, adding the new scores to the running totals in each type of contest: daily, short-term, "seasonal," league (including friends leagues) and overall;

7) it awards, and places on the graphical interface accessed by each winning player, graphical "trophies" symbolizing the victory and awards "Prize Points" in accordance with an established schedule; and 8) it resets itself and begins gathering selections for the next game;

9) it retains each player's score for the three games preceding the most recent game, in addition to the most recent game, in order to enable players to view their past scores even if they miss a day visiting the game;

10) it records all top scoring performances in daily contests, bi-weekly contests, seasonal contests, and cumulative contests in a "Hall of Fame" archive.

SUMMARY OF THE INVENTION

In one aspect, the present invention provides a method of playing a multiplayer sports game which corresponds to a sporting event such as a baseball game or other sporting event comprising the steps of:

providing, to each of a plurality of players, a form for forecasting the performance in a plurality of athletic performance categories of a plurality of athletes participating in the sporting event, where each athlete belongs to the same actual sports team;

receiving from each of the players, prior to the beginning of the sporting event, forecast decisions regarding the performance of one or more of said athletes in one or more of said athletic performance categories;

obtaining, after the conclusion of the sporting event, information regarding actual performances at the sporting event of the athletes in the performance categories; and generating a score for each player based upon the correlation between the forecast decision received from each player and the actual performances of the athletes.

In other aspects, the present invention provides the method of playing a multiplayer sports game described above wherein the sporting event alternatively is a baseball game, basketball game, football game, soccer game, a hockey game, or other sports contexts by way of example, football, basketball, hockey, soccer, golf, tennis, horse racing, auto racing, etc.

In another aspect, the present invention provides the method of playing a multiplayer sports game described above wherein said method is conducted over a communication medium operably connected to plural input/output devices each having means for inputting and outputting information.

In another aspect, the present invention provides the method of playing a multiplayer sports game described above wherein said method is conducted over the Internet.

In another aspect, the present invention provides the method of playing a multiplayer sports game described above further comprising the step of permitting each of the players to designate an athletic performance category for an athlete as a risk selection, where the risk selection will extraordinarily increase a player's score if a first condition is satisfied and will decrease the player's score if a second condition is satisfied, where the first and second conditions are determined by information regarding the actual performance at the sporting event obtained in said obtaining step.

In another aspect, the present invention provides a method of remotely interfacing with at least one player in a rule-governed game over a communication medium operatively connected to plural communication devices having input and output means including visual display means comprising, with respect to any one of the at least one players, the steps of:

(a) visually displaying at one of the plural communication devices being used by the player a form comprising a matrix having a cell at the juncture of each row and column and where each cell may be manipulated to reflect a game choice by the player;

(b) retrieving by a server each game choice made by the player and gathered by a client-based application after the player has completed his or her selections;

(c) applying the rules of the game to determine what further game choices are available to the player based upon the game choices received;

(d) generating a revised form reflecting game choices made by the player and game choices which are available for the player to make;

(e) transmitting the revised form to the one of the plural communication devices being used by the player; and (f) visually displaying the revised form at one of the plural communication devices being used by the player.

In another aspect, the invention provides the method of remotely interfacing described above, the method further comprising the step of:

(g) repeating steps (b) through (f) until a predetermined actual event occurs.

DETAILED DESCRIPTION OF THE INVENTION

Figure 1A:
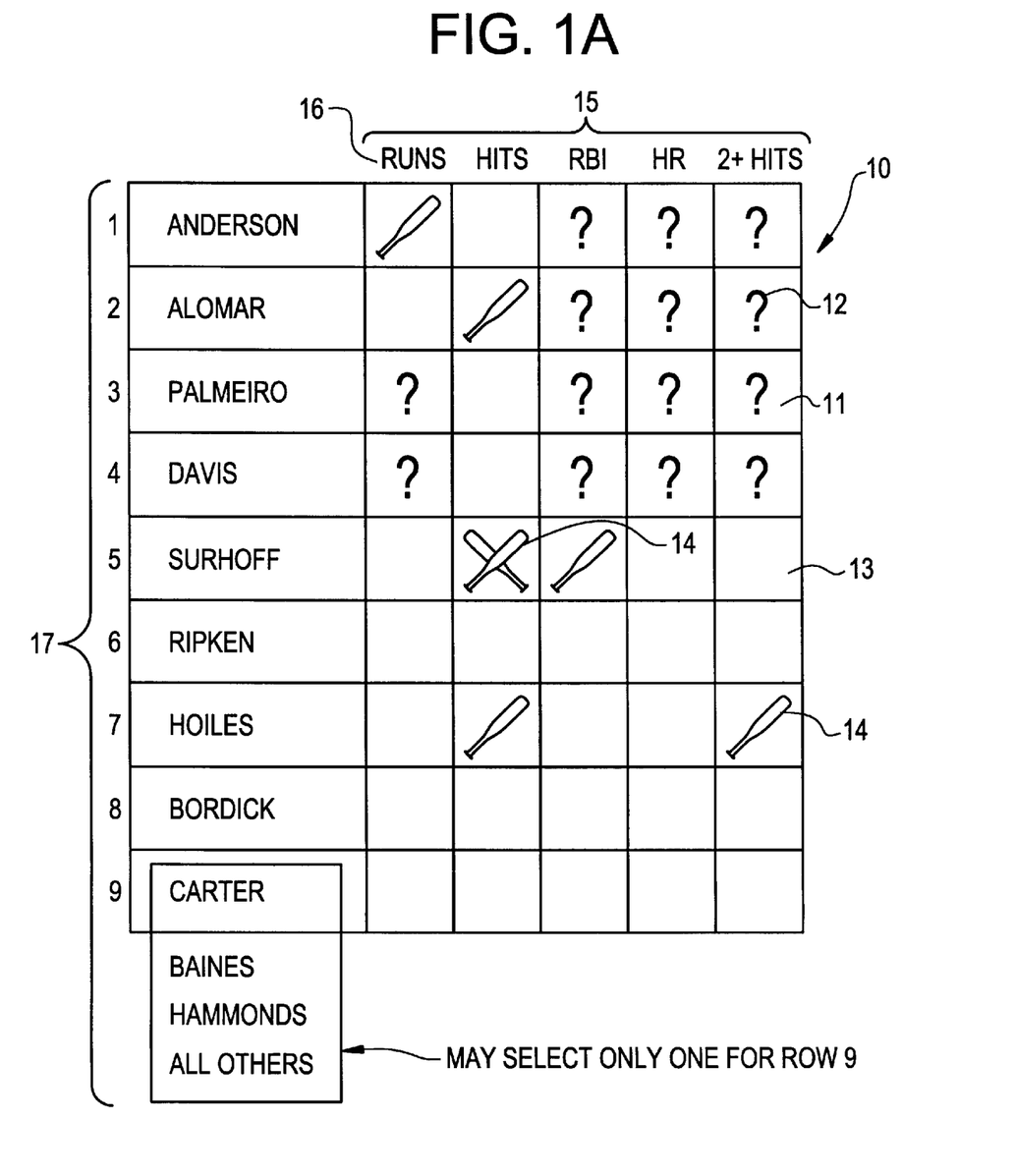
FIG. 1A depicts a form of a preferred embodiment after various game choices have been made by a player.
Figure 1B:
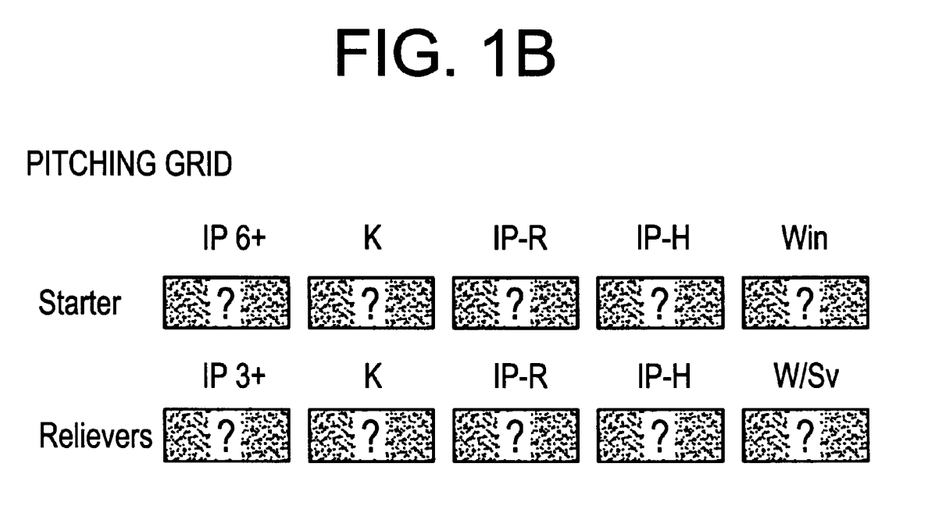
FIG. 1B depicts a form of a preferred embodiment after various game choices have been made by a player.
Figure 2:
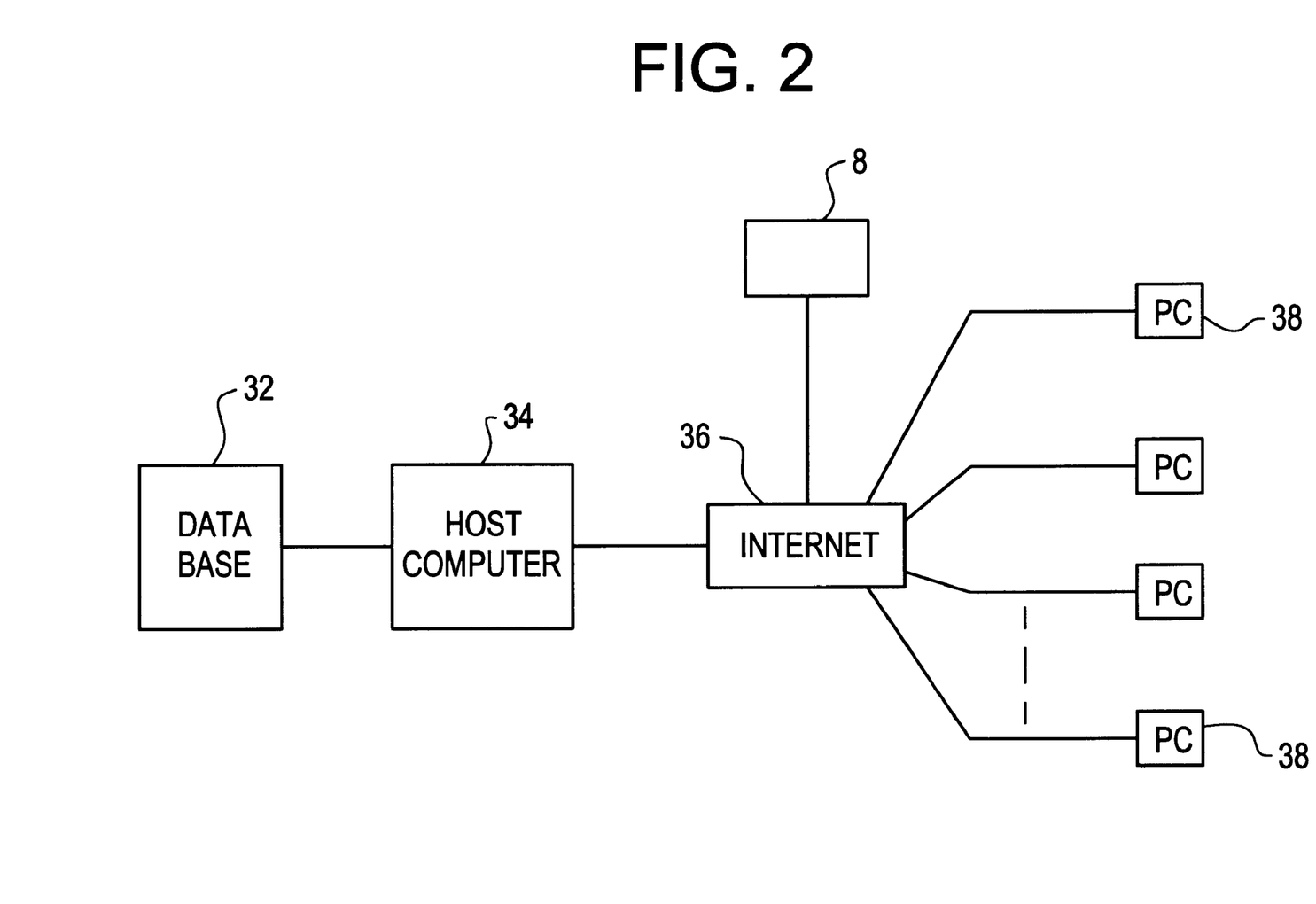
FIG. 2 is a symbolic diagram depicting the infrastructure over which a preferred embodiment is practiced.

In a preferred embodiment, the game is played over the Internet using World Wide Web technology although any communication medium could be used including conventional Local Area Networks (LANs), Wide Area Networks (WANs), or electronic Bulletin Board Systems (BBSs). The preferred embodiment will be described in the context where the sport is Major League baseball; however, the invention may be practiced with respect to any team or other sport (e.g. basketball, football, soccer, hockey, golf, tennis, horse racing, auto racing, etc.) at any level (Minor League, College, High School, Little League, etc.). With reference to FIGS. 1A, 1B, and 2, a server 34 sends a blank form 10 over the Internet 36 to the personal computer ("PC") 38 of the player who has requested the form 10. The player's personal computer may be any computer with a modem as commonly found in households such as computers based on technology from Apple Computer (e.g., The Macintosh, The Performa, the PowerMac series, etc.) or technology based on processors by Intel, AMD, and Cyrix and commonly referred to as IBM compatibles. It should be noted however that a player need not have a computer (i.e., a machine with processing power); a so-called "dumb terminal" being sufficient.

In FIG. 1A, the form 10 is a matrix. In the preferred embodiment being described, the form is a two dimensional matrix where one dimension, arbitrarily the columns 15, represents athletic performance categories 16 such as runs, hits, RBI's, home runs, and two or more hits, and the other dimension, arbitrarily the rows 17, represents athletic performers 18 who may be identified by name as in FIG. 1A, by position (not shown), or functionally as in FIG. 1B (e.g., Starter, Closer). Each cell 11 has the potential of representing a game choice relating to the athletic performance category 16 as performed by the athlete 18 which together define the cell 11. The last four rows of cells are held in a pull-down menu, from which each game player may select only one row to be active.

A blank form is a form 10 which reflects that the player has made no game choices and all possible game choices are still available. An available choice mark 12 such as that shown in FIG. 1A may be used to indicate which game choices are still available to a player after the rules are applied to the combination of the player's previous design choices.

After the player receives the blank form, he may begin making game choices according to the rules of the game. In the preferred embodiment, a player uses a mouse, trackball, keyboard, or other appropriate input device to manipulate a cell 11 which is available as a game choice as a means of selecting that cell as a game choice. In the preferred embodiment, such cells are readily discernible by the player by employing an available choice mark 12 in each such cell.

Once the player makes a game choice, that information is sent from the player's PC 38 to the server 34. This may be done in any manner known in the art. In the preferred embodiment, the player downloads a game program written in the form of the "Java" or "Java script" language to his or her client computer at the start of their play. This program runs on the client computer, enforcing the rules and facility play. When the game player has completed his or her selection, the program allows transmission of all selections at once to the server, where the selections are recorded in the game database. In an alternative embodiment, where the player's Web browser does not support Java script, the server 34 sends a common gateway interface (CGI) to the player's PC 38 which loads the CGI program into the memory of the player's PC. The CGI program is sent with the blank form and is in operation whenever the player is making game choices. The CGI program detects the selection of the cell corresponding to the player's game choice and sends that information to the server 34.

In the preferred embodiment, no further game choices may be made until the server 34 applies the rules to the player's game choice, revises the form 11 based on the application of the rules to the player's game choices, and then sends the revised form 11 to the player's PC 38.

Figure 4A:
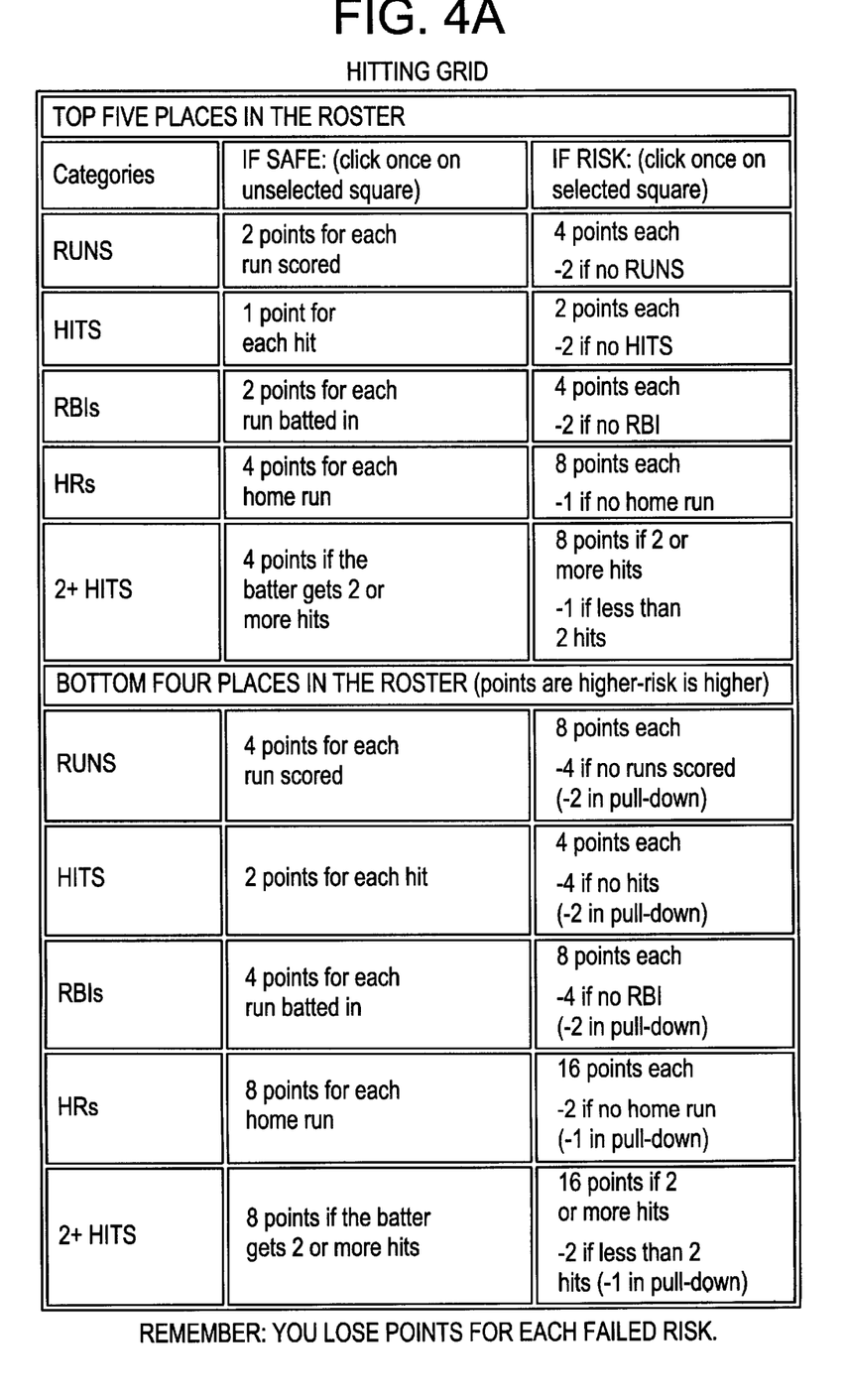
FIG. 4A is a table showing how points may be scored in a preferred embodiment based on the hitting performance of baseball athletes.
Figure 4B:
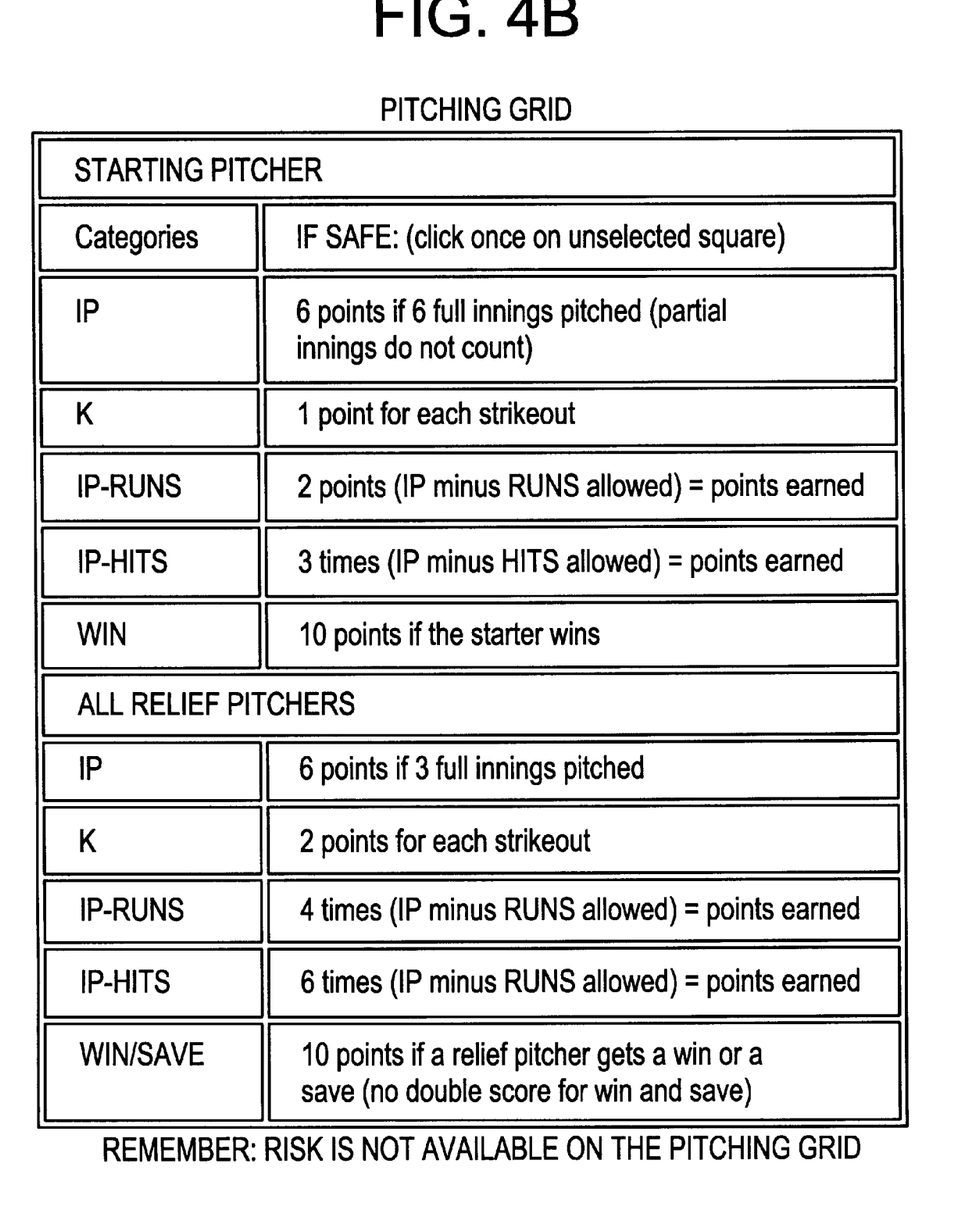
FIG. 4B is a table showing how points may be scored in a preferred embodiment based on the pitching performance of baseball athletes.

In the preferred embodiment, there are five athletic performance categories (for example: runs, hits, RBI, HRs, two-or-more hits, or other statistical category) and eleven athletes (8 named athletes and 3 selections representing "all other" members of the real-life team's roster. Three of the athletes and the "all others" category are displayed in a pull-down menu). In a preferred version of the game rules, a player may select no more than two athletic performance categories for any athlete, and a player may select only three athletes for each athletic performance categories. A player earns 1 point for each occurrence of certain game choices, 2 points for each occurrence of other game choices, and 4 points for each occurrence of still other game choices, except game choices involving athletes in the last 4 rows, which are worth twice the value of the points in the top 5 rows (see FIGS. 4A and 4B), and except for the impact of risk choices (see below).

Any game choice may be selected a second time to designate it as a risk choice. A risk choice will generate twice the score it would otherwise generate but it can result in the deduction of points if there are no occurrences of the game choice.

The player's game choices represent the player's forecast with respect to an actual baseball game that is yet to be played. Once the actual baseball game has commenced, no further game choices may be made with respect to that actual game (see step 72 of FIG. 3). Once the actual baseball game has ended, information from the actual game is input into a database 32 and compared against the player's game choices, and a score for the player is generated therefrom (see step 76 of FIG. 3). The database 32 would be stored on the server 34.

The present invention is not limited to the above rule set and any number of rules can be devised and subsequently programmed.

In an alternative embodiment, a rule program may be provided to the memory of the player's computer. The rules could thereby be applied to each game choice at the player's PC 38 without the need to provide each game choice to a server and wait for the revised form to be sent to the player's PC 38 before the next game choice may be made. The rule program may be implemented in any suitable known computer language such as a Java or Javascript.

Figure 3:
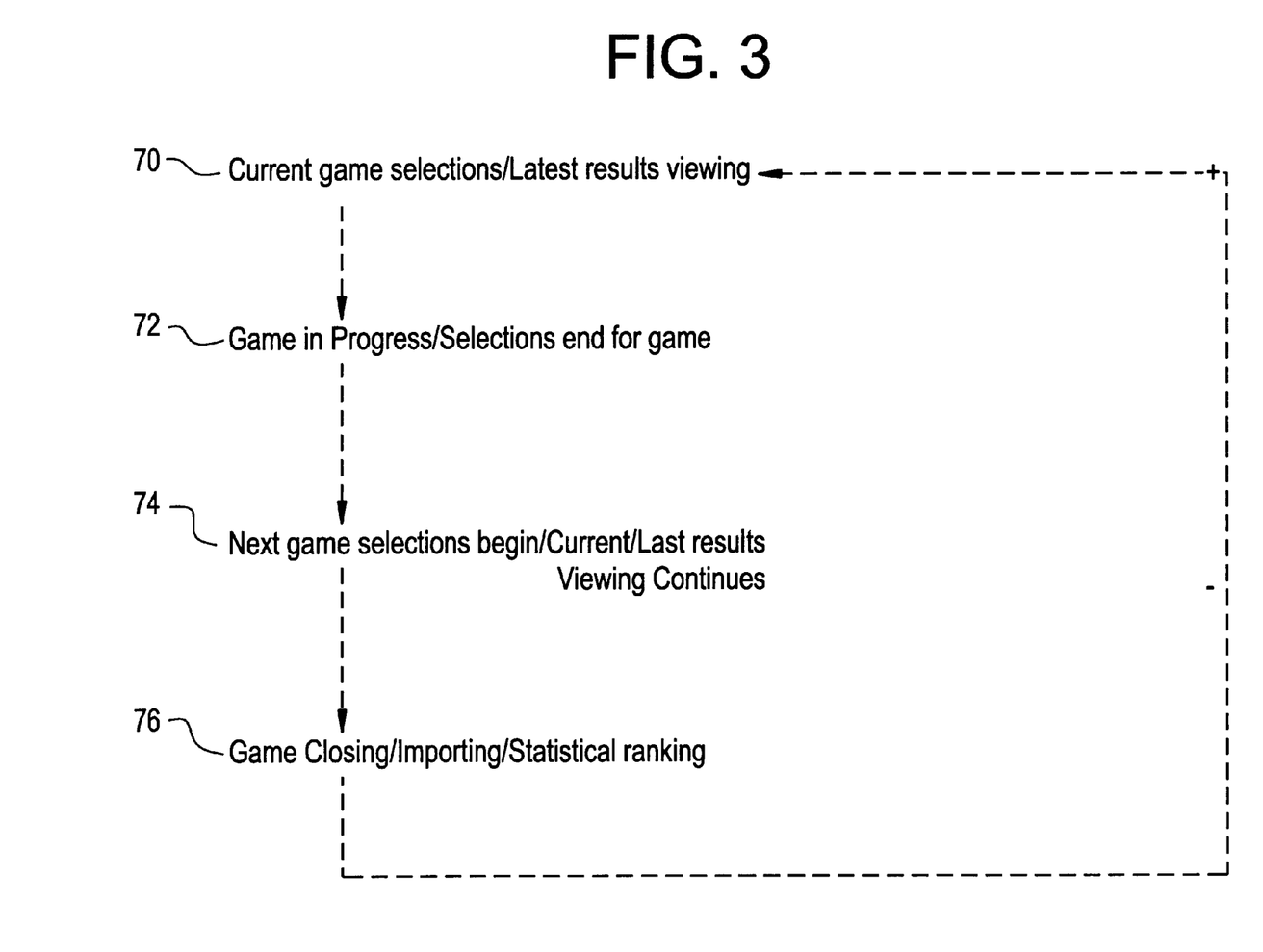
FIG. 3 is a flow diagram showing the relation ship between consecutive games.

Once the actual baseball game begins the rule program displays on the player's PC a "game in progress" mode 72 (see FIG. 3). At this time all the game choices for the next actual baseball game default to the same choices as were made for the immediately previous actual baseball game. However, in an alternative embodiment the game choices are cleared if the player's grid is not accessed a predetermined minimum number of times over a predetermined period of time.

When the actual Major League game play starts, the current game selections are frozen and are no longer subject to change. During the play of the game, players can change their selection in the "next game" selections pool, but may no longer alter their "current game" selections pool, which would be effectively cheating (see step 74 of FIG. 3). After the game, players can view their progress in the season-long game when the rule program applies current game choices to the information from the actual game and displays the results in CGI scripted interfaces or alternatively in HTML tables after the game (see step 76 of FIG. 3). A third party providing game information services such as Data Broadcasting Corporation, Sports Ticker, Inc., or Stats, Inc., may provide the game results data input (hits/RBI/IP/etc.) and for entry into the game database to provide results from the just completed game, which is considered the "current game."

Each player's individual game score is calculated by computing the total score of the current selections applied to the just completed current game. This single game score is scored separately for each player, and the scores are ranged, resulting in a daily "winner." After this first pass which calculates the single game scores, total, contest, and average scores are calculated by adding new scores to the pre-existing database, and, storing the score and associated user's record in a file, and reporting it to all players. After each game, the present invention stores the "fair ranking" back into each user's record for each of these four categories. The fair ranking is defined as 1+x where x is the number of players that attained scores which were greater than the player's score.

After the game is closed, the data is stored in the game library, and the "current game" becomes the "next game." All user's selections are shifted, thereby making their "next game" selections the "current" selections, and their "current" selections the "last game" selections. The site is again opened for players to peruse their results.

While the present invention has been illustrated and described with reference to specific embodiments, further modifications and alterations will occur to those skilled in the art within the spirit and scope of this invention.

What we claim is:

1. A method of playing a multiplayer sports game which corresponds to an actual sporting event comprising the steps of:
    (a) providing, to each of a plurality of players, a form for forecasting the performance in a plurality of athletic performance categories of a plurality of athletes participating in the sporting event, where each athlete belongs to the same actual sports team participating in said actual sporting event;
    (b) receiving from each of the players, prior to the beginning of the sporting event, forecast decisions regarding the performance of one or more of said athletes in one or more of said athletic performance categories;
    (c) obtaining, after the conclusion of the sporting event, information regarding actual performances at the sporting event of the athletes in the performance categories; and
    (d) generating a score for each player based upon the correlation between the forecast decision received from each player and the actual performances of the athletes.

2. The method of claim 1 wherein the sporting event is a baseball game.

3. The method of claim 1 wherein the sporting event is a basketball game.

4. The method of claim 1 wherein the sporting event is a football game.

5. The method of claim 1 wherein the sporting event is a hockey game.

6. The method of claim 1 wherein the sporting event is a soccer game.

7. The method of claim 1 wherein the sporting event is an auto race.

8. The method of claim 1 wherein said method is conducted over a communication medium operably connected to plural input/output devices each having means for inputting and outputting information.

9. The method of claim 8 wherein said communication medium is the Internet.

10. The method of claim 1 further comprising the step of permitting each of the players to designate an athletic performance category for an athlete as a risk selection, where the risk selection will increase a player's score if a first condition is satisfied and will decrease the player's score if a second condition is satisfied, where satisfaction of the first and second conditions are each determined by the information regarding the actual performance at the sporting event obtained in said obtaining step.

11. A method of remotely interfacing with at least one player in a rule-based game over a communication medium operatively connected to one or more communication devices each having input and output means including visual display means wherein each player is associated with a communication device, the steps comprising:
    (a) visually displaying at one or more of the communication devices a form comprising a two-dimensional matrix having a cell at the juncture of each row and column and where each cell may be manipulated to reflect a game choice by the player;
    (b) retrieving by a server each game choice made by the player and collected by a client-based application after the player has completed all game choice selections;
    (c) applying the rules of the game to determine what further game choices are available to the player based upon the game choices retrieved;
    (d) generating a revised form reflecting game choices made by the player and game choices which are available for the player to make;
    (e) transmitting the revised form to the communication device being used by the player; and
    (f) visually displaying the revised form at the communication device being used by the player.

12. The method of claim 11 further comprising the step of repeating steps (b) through (f) until a predetermined actual event occurs.

13. The method of claim 11, wherein the communication medium is the Internet.

14. The method of claim 11, wherein said game is based on statistics generated by an actual Major League baseball game, and said game choices relate to statistical categories for athletes participating in said actual game.

15. The method of claim 14, further comprising the step of displaying the results of said rule-based game on the player's communication device substantially in real time subsequent to the completion of said actual game.

16. A method of playing a multiplayer sports game which corresponds to an actual sporting event, comprising the steps of:
   (a) providing, to each of a plurality of players, a form for forecasting the performance in a plurality of athletic performance categories of a plurality of athletes participating in the sporting event, where each athlete belongs to the same actual sports team participating in said actual sporting event;
   (b) receiving from each of the players, prior to the beginning of the sporting event, forecast decisions regarding the performance of one or more of said athletes in one or more of said athletic performance categories;
   (c) obtaining, after the conclusion of the sporting event, information regarding actual performances at the sporting event of the athletes in the performance categories; and
   (d) generating a score for each player based upon the correlation between the forecast decision received from each player and the actual performances of the athletes;
   wherein the step of providing comprises the step of visually displaying at one or more communication devices over a communication medium a form comprising a two-dimensional matrix having a cell at the juncture of each row and column and where each cell may be manipulated to reflect a game choice by the player; and wherein the step of receiving comprises the steps of retrieving by a server each game choice made by the player and collected by a client-based application after the player has completed all game choice selections, applying the rules of the game to determine what further game choices are available to the player based upon the game choices retrieved, generating a revised form reflecting game choices made by the player and game choices which are available for the player to make, transmitting the revised form to the communication device being used by the player, and visually displaying the revised form at the communication device being used by the player.

17. The method of claim 16, wherein the communication medium is the Internet.

18. The method of claim 16, wherein said game is based on statistics generated by an actual Major League baseball game, and said game choices relate to statistical categories for athletes participating in said actual game.

19. The method of claim 18, further comprising the step of displaying the results of said rule-based game on the player's communication device substantially in real time subsequent to the completion of said actual game.

20. The method of claim 16, further comprising the step of permitting each of the players to designate an athletic performance category for an athlete as a risk selection, where the risk selection will increase a player's score if a first condition is satisfied and will decrease the player's score if a second condition is satisfied, where satisfaction of the first and second conditions are each determined by the information regarding the actual performance at the sporting event obtained in said obtaining step.

* * * * *